(12) United States Patent
Demaratos

(10) Patent No.: US 12,294,177 B2
(45) Date of Patent: May 6, 2025

(54) METHOD FOR ELECTROMAGNETIC INTERFERENCE (EMI) PROTECTION FOR A HIGH VOLTAGE CONNECTOR ASSEMBLY HAVING A CONDUCTIVE OUTER HOUSING, WITH AT LEAST A CONDUCTIVE TAB, THAT ACCOMMODATES THEREIN A SEAL SPRING

(71) Applicant: J.S.T. CORPORATION, Farmington Hills, MI (US)

(72) Inventor: David Demaratos, Wixom, MI (US)

(73) Assignee: J.S.T. CORPORATION, Farmington Hills, MI (US)

( * ) Notice: Subject to any disclaimer, the term of this patent is extended or adjusted under 35 U.S.C. 154(b) by 439 days.

(21) Appl. No.: 17/710,548

(22) Filed: Mar. 31, 2022

(65) Prior Publication Data
US 2022/0320804 A1  Oct. 6, 2022

Related U.S. Application Data

(60) Provisional application No. 63/169,511, filed on Apr. 1, 2021.

(51) Int. Cl.
*H01R 13/52* (2006.01)
*F16J 15/02* (2006.01)
(Continued)

(52) U.S. Cl.
CPC ........ *H01R 13/5219* (2013.01); *F16J 15/024* (2013.01); *F16J 15/025* (2013.01);
(Continued)

(58) Field of Classification Search
CPC .............. H01R 13/5202; H01R 13/652; H01R 13/6581; H01R 43/18; H01R 13/6598; H01R 13/6485
See application file for complete search history.

(56) References Cited

U.S. PATENT DOCUMENTS 4,195,893 A    4/1980  Stupay
4,781,623 A  * 11/1988  Philippson ......... H01R 13/6593
                                              439/676
(Continued)

OTHER PUBLICATIONS

International Search Report for International Application No. PCT/US2022/022391 dated Aug. 19, 2022 (4 sheets).
(Continued)

*Primary Examiner* — Jeffrey T Carley
*Assistant Examiner* — Jose K Abraham
(74) *Attorney, Agent, or Firm* — Kratz, Quintos & Hanson, LLP

(57) ABSTRACT

The present invention involves a method for reducing the effect of electromagnetic interference (EMI) by providing EMI protection to a high voltage connector assembly, by employing a conductive outer housing, having a conductive tab or plurality of conductive tabs, the conductive outer housing also accommodating a seal (seal spring), a second outer housing, and a conductive third outer housing. The tabs being conductive coated to provide an element or portion of a grounding scheme for a connector assembly containing the outer housing. The conductive tabs make substantial contact with the conductive third outer housing and complete a portion of the connector assembly grounding scheme. The seal spring provides more force, additional force, for higher contact pressure with the third outer housing than would be present without the seal spring, resulting in better electrical conductivity between a conductive tab and the conductive third outer housing when in use.

8 Claims, 5 Drawing Sheets

(51) Int. Cl.
*H01R 13/506* (2006.01)
*H01R 13/652* (2006.01)
*H01R 13/6581* (2011.01)
*H01R 43/00* (2006.01)
*H01R 43/18* (2006.01)

(52) U.S. Cl.
CPC ........... *F16J 15/028* (2013.01); *H01R 13/506* (2013.01); *H01R 13/5202* (2013.01); *H01R 13/5208* (2013.01); *H01R 13/5216* (2013.01); *H01R 13/652* (2013.01); *H01R 13/6581* (2013.01); *H01R 43/005* (2013.01); *H01R 43/18* (2013.01)

(56) References Cited

U.S. PATENT DOCUMENTS

| | | | | |
|---|---|---|---|---|
| 4,886,463 | A * | 12/1989 | Scott | H01R 13/6583 439/272 |
| 5,518,421 | A * | 5/1996 | Davis | H01R 13/506 439/607.5 |
| 5,782,657 | A | 7/1998 | Wolla | |
| 6,015,304 | A | 1/2000 | Yagi | |
| 6,234,847 | B1 | 5/2001 | Chang | |
| 6,554,623 | B2 * | 4/2003 | Yoshioka | H01R 13/6592 439/98 |
| 7,976,340 | B1 | 7/2011 | Saraswat | |
| 8,157,589 | B2 * | 4/2012 | Krenceski | H01R 24/40 439/578 |
| 8,303,342 | B2 * | 11/2012 | Shi | H01R 13/6581 439/607.41 |
| 8,348,688 | B2 * | 1/2013 | Liu | H01R 13/5219 439/271 |
| 9,337,577 | B1 * | 5/2016 | Hitchcock | H01R 13/6315 |
| 9,431,771 | B1 * | 8/2016 | Sundarakrishnamachari | H01R 13/6583 |
| 9,496,656 | B2 * | 11/2016 | Hsu | H01R 12/724 |
| 9,882,332 | B2 * | 1/2018 | Frederick | H01R 43/26 |
| 10,116,078 | B1 | 10/2018 | Durse et al. | |
| 2001/0053624 | A1 | 12/2001 | Medina | |
| 2002/0142636 | A1 | 10/2002 | Murr | |
| 2003/0008555 | A1 * | 1/2003 | Obata | H01R 13/6582 439/578 |
| 2004/0147146 | A1 | 7/2004 | Vermeersch | |
| 2006/0134982 | A1 | 6/2006 | Zarganis | |
| 2007/0059970 | A1 | 3/2007 | Ichio | |
| 2007/0243730 | A1 * | 10/2007 | Gladd | H01R 13/65917 439/98 |
| 2008/0057758 | A1 | 3/2008 | Walter | |
| 2008/0299826 | A1 | 12/2008 | Cheng | |
| 2008/0318473 | A1 | 12/2008 | Morikawa | |
| 2010/0003852 | A1 | 1/2010 | Myer | |
| 2010/0093217 | A1 * | 4/2010 | Shi | H01R 24/60 439/607.41 |
| 2010/0160991 | A1 | 6/2010 | Lim | |
| 2011/0189888 | A1 * | 8/2011 | Rhein | H01R 13/5202 439/572 |
| 2011/0280653 | A1 | 11/2011 | Sjostedt | |
| 2013/0072063 | A1 | 3/2013 | Qiao | |
| 2014/0053402 | A1 * | 2/2014 | Margrave | H01R 13/502 29/876 |
| 2014/0106597 | A1 | 4/2014 | Gimbel et al. | |
| 2014/0329399 | A1 * | 11/2014 | Ohsumi | H01R 43/24 439/276 |
| 2015/0207263 | A1 * | 7/2015 | Fabre | H01R 13/6581 439/271 |
| 2017/0018874 | A1 | 1/2017 | Kida | |
| 2020/0099172 | A1 * | 3/2020 | Zhou | H01R 13/6592 |
| 2020/0099174 | A1 * | 3/2020 | Andre | G06F 1/184 |

OTHER PUBLICATIONS

International Search Report for International Application No. PCT/US2022/022605 dated Aug. 19, 2022 (4 sheets).

International Search Report for International Application No. PCT/US2022/022912 dated Jul. 8, 2022 (2 sheets).

* cited by examiner

METHOD FOR ELECTROMAGNETIC INTERFERENCE (EMI) PROTECTION FOR A HIGH VOLTAGE CONNECTOR ASSEMBLY HAVING A CONDUCTIVE OUTER HOUSING, WITH AT LEAST A CONDUCTIVE TAB, THAT ACCOMMODATES THEREIN A SEAL SPRING

CROSS-REFERENCE TO RELATED PATENT APPLICATION

This patent application claims priority to Provisional Patent Application Ser. No. 63/169,511 filed on Apr. 1, 2021, which is hereby incorporated herein by reference in its entirety.

BACKGROUND OF THE INVENTION

Electromagnetic interference (EMI) affects an electrical circuit due to a disturbance, from a source, by electromagnetic induction, electrostatic coupling or conduction. EMI may degrade the performance of a circuit or may even stop it from functioning. In the case where the circuit includes a data path, EMI may affect the effectiveness of the data path due to an increase in error rate to the total loss of the data. A source that may generate changing electrical currents and voltage that may cause EMI may include, for example, automotive injection systems, mobile phone cellular network, or the like. It is thus essential to manage the generation of EMI to avoid the detrimental effects caused by it; and to consequently maximize the effectiveness of an electrical circuit that may otherwise be vulnerable to the detrimental effects of EMI.

Ways to avoid or reduce the detrimental effects of EMI include conduction, shielding, or the like. EMI protection by conduction is achieved by the conduction of EMI between conductive elements or conductors that are in physical contact, while EMI protection by shielding is achieved by shielding radiated EMI by induction (i.e., the absence of physical contacts of conductors). In a high voltage connector assembly, conducted EMI is directed through a path of adjoining conductive elements or conductors and towards a device onto which the connector assembly is in line with, or attached or mounted to, the device acting as ground.

It is thus desired that the structure or structural arrangement of a conductive outer housing, employed in the high voltage connector assembly of the present invention, provide complete or substantial EMI coverage by using electrically conductive coated tabs providing contact pressure against a conductive third outer housing, the conductive tabs making contact with this conductive third outer housing, therein completing a grounding scheme within a completed high voltage connector assembly. The conductive outer housing, also being able to accommodate a seal (seal spring) providing additional force against the conductive tabs, providing for higher contact pressure against the conductive third outer housing when used within a completed high voltage connector assembly and when the completed high voltage connector assembly is in use. The higher contact pressure results in a better electrical conductivity between the conductive tab and the conductive third outer housing when in use.

SUMMARY OF THE INVENTION

This invention is directed to a method for reducing the effect of electromagnetic interference (EMI) by providing EMI protection to a high voltage connector assembly, which employs a conductive outer housing, having a conductive tab or plurality of conductive tabs within an inner cavity. The conductive outer housing may accommodate a seal (seal spring), a second outer housing, and a conductive third outer housing in its inner cavity, when in use. The conductive tabs of the conductive outer housing extend within the inner cavity of the conductive outer housing, towards an opening of the conductive outer housing. The conductive outer housing also has a seal forward stop to prevent the further forward motion of the seal (seal spring) into the inner cavity. The seal (seal spring) will interact with the tabs when the seal (seal spring) is inserted within the inner cavity, and will apply a spring force against the conductive tabs when the seal (seal spring) is fully inserted.

The conductive tabs of the conductive outer housing are conductive coated to provide an element or portion of a grounding scheme for a connector assembly employing the conductive outer housing. The conductive tabs may make substantial contact with a conductive third outer housing and complete a portion of the connector assembly grounding scheme when the outer housing is used in a completed high voltage connector assembly. This reduces the effect of electromagnetic interference (EMI), and aids in EMI suppression. When the conductive outer housing is provided with a seal spring, the seal spring provides more force, additional force, for higher contact pressure with the conductive third outer housing than would be present without the seal spring.

In, for example, the embodiments of this invention in which at least one conductive tab of the conductive outer housing contacts the, e.g., conductive third outer housing, the generated EMI passes from the conductive outer housing to the at least one of a conductive tab, and into the conductive third outer housing. The path of the EMI further travels from the conductive third outer housing to and passes through and travels directly to a further connector grounding scheme (not shown), or traditional shielding means (not shown, ie. stamped shield), and leading to ground. Alternatively, the reverse of the aforementioned flow path can also be accomplished, in the case where the EMI flow path is in the opposite direction due to the location of the ground, grounding device, or grounding element. The EMI may pass through and travel directly from a connector grounding scheme (not shown), or a traditional shielding means (not shown, ie. stamped shield) directly to the conductive third outer housing, to the conductive tab 230a, 230b, to the conductive outer housing 200, to the one of a wire shielding (not shown), a connector grounding scheme (not shown), or a traditional shielding means (not shown, ie. stamped shield), and leading to ground.

DETAILED DESCRIPTION OF THE PREFERRED EMBODIMENTS

Figure 1:
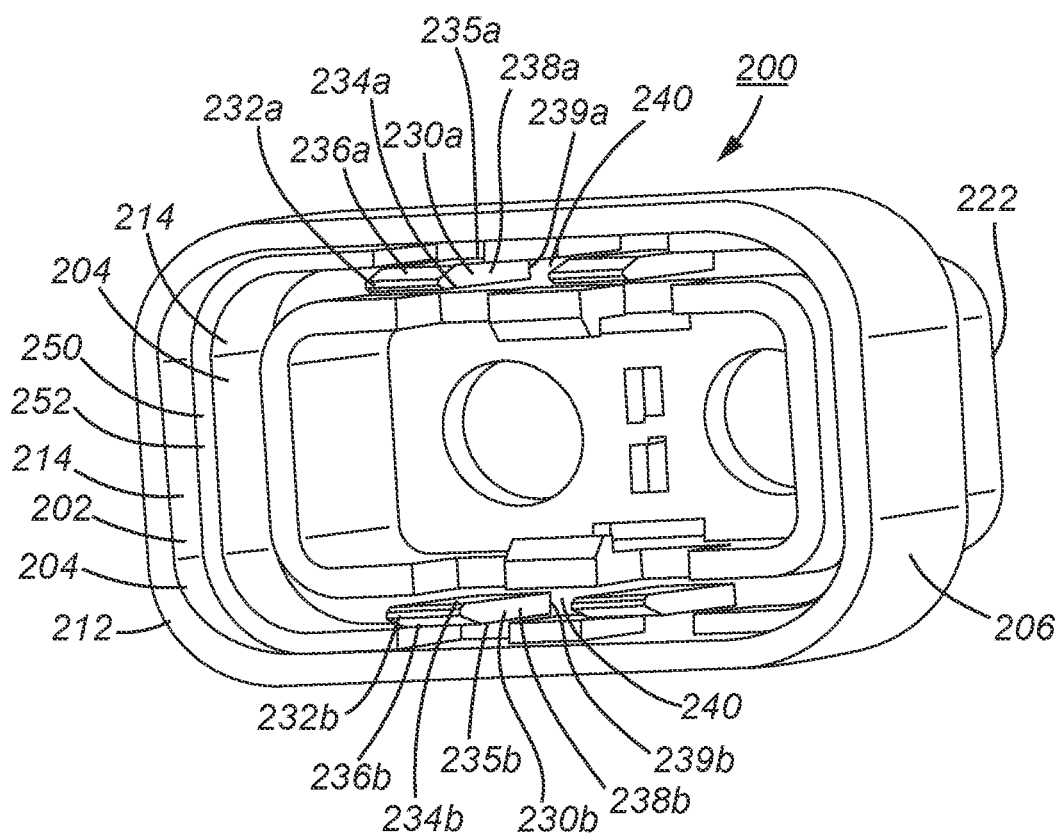
FIG. 1 is an end perspective view of the conductive outer housing of the present invention.

Shown in FIG. 1 is the conductive outer housing 200 of a high voltage connector assembly. The conductive outer housing 200 has a body 206. At one end of the body 206 is the first end portion 212, and at the opposite end is the second end portion 222. The body 206, also has an inner cavity 204, the inner cavity 204 having a side wall 214. Additionally, the inner cavity 204 of the conductive outer housing 200 has an opening 202 within the first end portion 212 of the conductive outer housing 200. The opening 202 leading to the inner cavity 204. The inner cavity 204 of the conductive outer housing 200 also has a seal forward stop 250 having a surface 252. The seal forward stop 250 with a surface 252, extending substantially perpendicular along its length from the side wall 214 with respect to a lengthwise direction of the conductive outer housing 200 (being defined as the direction from the first end portion 212 to the second end portion 222, and vice versa). The seal forward stop 250 and its surface 252 are provided to interact with a seal spring 100 when the seal spring 100 is inserted into the inner cavity 204, and the seal spring 100 is in use with the conductive outer housing 200. The seal forward stop 250 being provided to prevent and halt the further, forward insertion of the seal spring 100 into the inner cavity 204 towards the second end portion 222 (see, FIG. 2-4).

The conductive outer housing 200 is preferably made of a contiguous single construct or form, no welding or brazing. Moreover, the conductive outer housing 200 of the present invention is, substantially, in its entirety, of a contiguous and continuous single construction. No part or section of the conductive outer housing 200 of the present invention is made up of welded, soldered, or brazen part or section.

The conductive outer housing 200 is made of a conductive metal-infused material, a conductive metal-filled material or the like, the material being plastic, resin, nylon, or similar materials having similar properties during intended use. The conductive metal in the metal-infused material or metal-filled material of the conductive outer housing 200 is, e.g., stainless steel or metal with similar conductive properties. An example of the conductive metal-infused material or conductive metal-filled material of the conductive outer housing 200 is a stainless steel-filled resin or stainless steel-infused resin made by RTP Corp.

Also shown in FIG. 1 is a first conductive tab 230a of the conductive outer housing 200 and a second conductive tab 230b of the conductive outer housing 200. Each tab 230a, 230b is also preferably electrically conductive coated for use in a grounding scheme, as will be described later (see, FIG. 5, 6). The conductive outer housing 200 may have a pair of first conductive tabs 230a, as shown, but the quantity is not limited thereto. The conductive outer housing 200 may have a pair of second conductive tabs 230b, as shown, but the quantity is not limited thereto. The first conductive tab 230a of the conductive outer housing 200 and the second conductive tab 230b of the conductive outer housing 200 extend within the inner cavity 204, extending substantially perpendicularly from a rear wall 240 of the conductive outer housing 200. The rear wall 240 is within the inner cavity 204 and extends substantially perpendicular along its length from the side wall 214 of the inner cavity 204 of the conductive outer housing 200, with respect to a lengthwise direction of the conductive outer housing 200 (being defined as the direction from the first end portion 212 to the second end portion 222, and vice versa). The first conductive tab 230a and second conductive tab 230b each have a tip 232a, 232b, respectively, located at an end of each conductive tab 230a, 230b. The conductive tab 230a, 230b extends within the inner cavity 204 towards the opening 202, the direction of which having the tip 232a, 232b facing substantially towards the opening 202 of the conductive outer housing 200. The other, opposite end of the conductive tab 230a, 230b, is the attached end 239a, 239b. The attached end 239a, 239b is the portion of the conductive tab 230a, 230b attached to the rear wall 240 of the conductive outer housing 200. Each conductive tab 230a, 230b having a cantilever beam arm 238a, 238b, respectively. The cantilever beam arm 238a, 238b is formed by and along the length of the conductive tab 230a, 230b, more specifically, by the portion of the conductive tab 230a, 230b between the attached end 239a, 239b and the tip 232a, 232b.

The first conductive tab 230a and second conductive tab 230b, each also have an angled lead in 236a, 236b, respectively. Each of the angled lead in 236a, 236b is angled, or tapered generally along its length towards the tip 232a, 232b, and tapering in a direction with respect to the lengthwise direction of the conductive outer housing 200 (being defined as the direction from the first end portion 212 to the second end portion 222, and vice versa). Each of the angled lead in 236a, 236b substantially faces the side wall 214 of the inner cavity 204 of the conductive outer housing 200. The angled lead in 236a, 236b of each of the first conductive tab 230a and second conductive tab 230b are provided to make contact with the seal spring 100 when in use, and as discussed later.

The first conductive tab 230a and second conductive tab 230b each also have a first surface 234a, 234b and a second surface 235a, 235b, respectively. Each first surface 234a, 234b face the inner cavity 204 of the conductive outer housing 200. Each first surface may face another one of a first surface 234a, 234b. As seen in FIG. 1, along its length, the first surface 234a of the first conductive tab 230a substantially faces the opposing, opposite, first surface 234b of the second conductive tab 230b, and vice versa. The second surface 235a, 235b faces the side wall 214 of the inner cavity 204 of the conductive outer housing 200.

Figure 2:
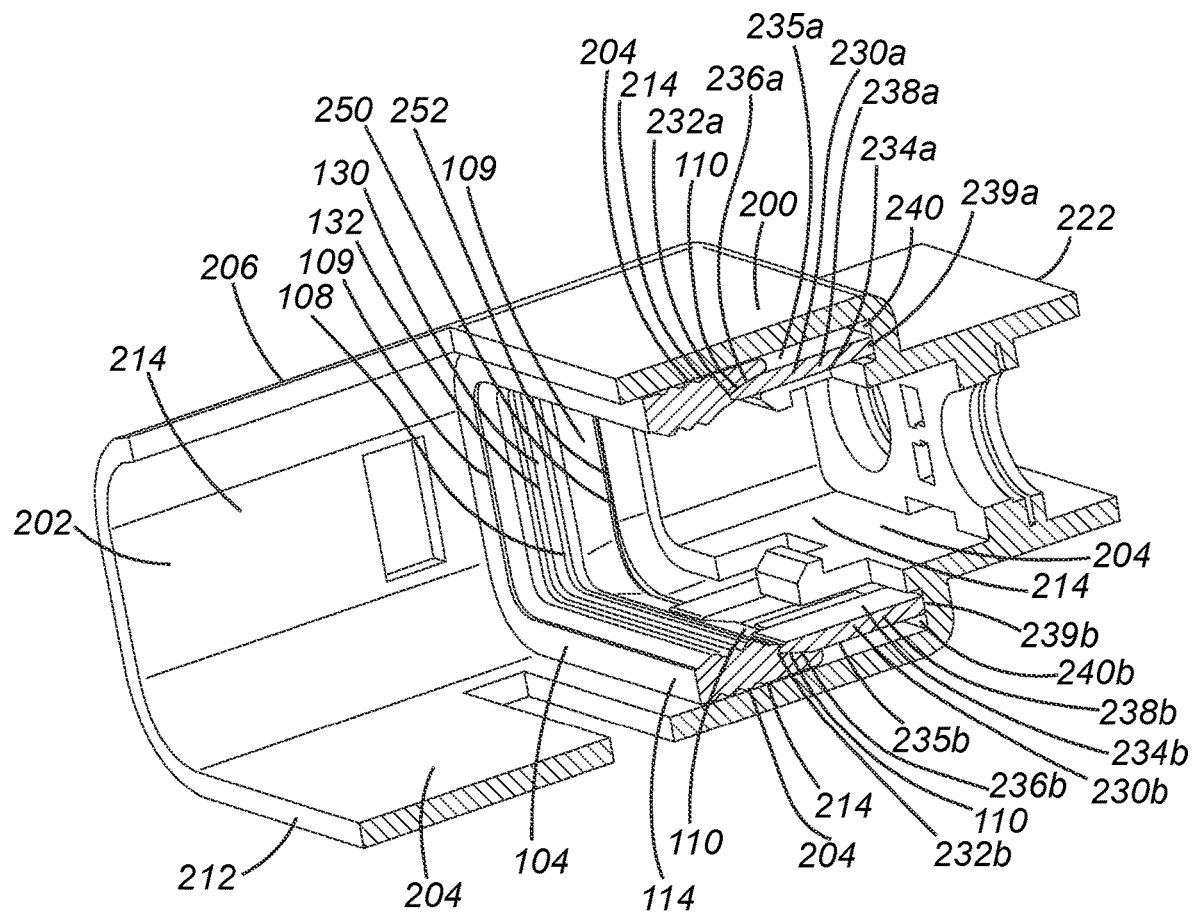
FIG. 2 is a cross section view of the conductive outer housing and the seal spring, the seal spring residing in the conductive outer housing.

Illustrated in FIG. 2 is the conductive outer housing 200 with the seal spring 100 inserted. Here the seal spring 100 is inserted into the conductive outer housing 200, and the first face 102 is inserted first towards the rear 222 of the conductive outer housing 200. The first face 102 and first face surface 112 of the seal spring 100 may also abut the forward stop 250 and surface 252 thereof. The first conductive tab 230a and second conductive tab 230b of the conductive outer housing 200 have entered the inner aperture 108 of the seal spring 100, the respective tips 232a, 232b have initially entered the inner aperture 108 of the seal spring 100 and have made contact with the seal spring 100. Further, the angled lead in 236a, 236b of each of the respective conductive tab or conductive tabs 230a, 230b will make further contact with the inner side wall 109 of the seal spring 100 as the seal spring 100 is inserted further into the conductive outer housing 200, as shown.

Figure 3:
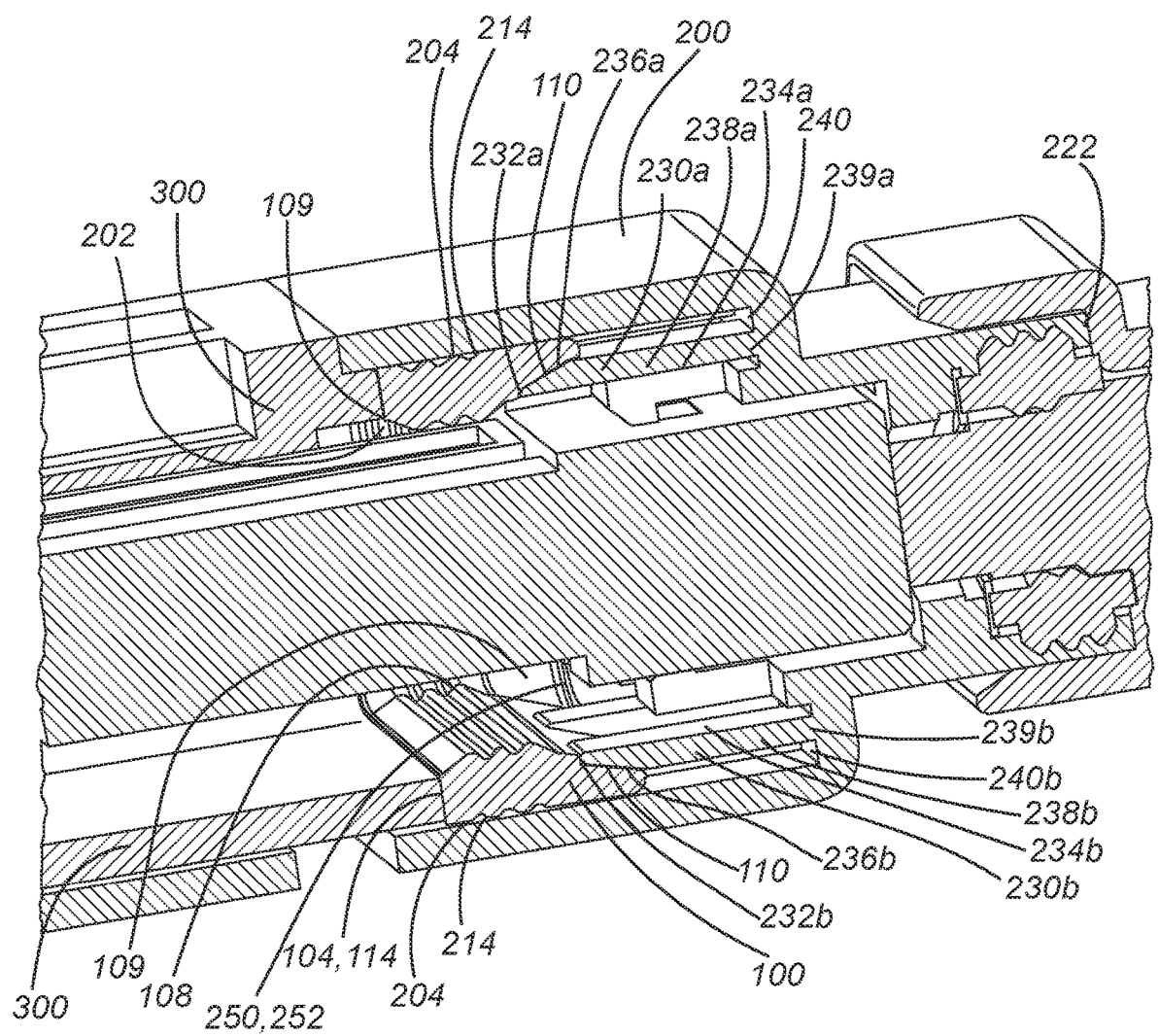
FIG. 3 is a cross section view of the conductive outer housing, the conductive outer housing having the seal spring inserted and residing in the cavity of the conductive outer housing, the second outer housing installed.

As seen in FIG. 3, the seal spring 100 may be inserted into the conductive outer housing 200 and the seal spring 100 will be held in the conductive outer housing 200 by a second outer housing 300. The cavity of the conductive outer housing 200 and the seal spring 100 has a space wherein a conductive third outer housing 400 may be inserted and accommodated, as will be seen in FIG. 4.

As discussed above, the conductive tabs 230a, 230b abut and contact against the surface 110 of the inner side wall 109 of the seal spring 100. More specifically, the conductive tabs 230a, 230b abut and contact the flared, or angled portion of the inner side wall 109. The flared, or angled portion of the inner side wall 109 of the seal spring 100 compresses as the conductive tab 230a, 230b enters the inner aperture 108 and contacts the seal spring 100, wherein the seal spring 100 asserts a spring-like force against the conductive tab 230a, 230b. The conductive tabs 230a, 230b, as shown in FIG. 2, have pressed into, and pushed into, the inner surface 109 of the seal spring 100. The seal spring 100 can be further inserted into the conductive outer housing 200 and conductive tabs 230a, 230b and will further press into, and push into the inner surface 109 of the seal spring 100 when the second outer housing 300 is inserted and subsequent conductive third outer housing 400 is then inserted (See, FIG. 3, 4). The seal spring 100 will provide and exert an adequate spring force against the conductive tab 230a, 230b and apply its spring force, pushing itself in an outward direction towards and against the tip 232a, 232b, the angled lead in 236a, 236b, and the second surface 235a, 235b of the conductive tab 230a, 230b when in use. Further, the angle or taper of the inner side wall 109 is such that the angled lead in portion 236a, 236b of the conductive tab 230a, 230b will reside on the flared, or angled portion of the inner side wall 109 when the conductive tab 230a, 230b makes substantial contact with the surface 110 of the inner side wall of seal spring 100. The tip 232a, 232b of each conductive tab 230a, 230b, may not make substantial contact with the first face 102 of the seal spring 100, as it is inserted into the housing 200. Therein, the first face 102 will reside below the tip 232a, 232b, angled lead in 236a, 236b, and the second surface 235a, 235b when the seal spring 100 is inserted. Moreover, the angle or taper of the inner side wall 109, is such that the flared, or angled portion of the inner side wall 109 will reside below the angled lead in portion 236a, 236b of the respective conductive tab 230a, 230b. Thus, the spring force of the seal spring 100 is asserted and applied to the conductive tab 230, 230b by the angle or tapered portion of the inner side wall 109. More specifically, the spring force is generally directed toward and against the angled lead in portion 236a, 236b of the conductive tab 230a, 230b. The conductive tab 230a, 230b is slightly flexible, and is preferably flexible along its length at the cantilever beam arm 238a, 238b portion. The conductive tab 230a, 230b will flex when the tip 232a, 232b, angled lead in 236a, 236b, or second surface 235a, 235b is contacted, as here, by the seal spring 100 (see, FIG. 3, 4). The angle or taper of the inner side wall 109 of the seal 100 also prevents the seal spring 100 from being marred, warped, ripped, or torn or otherwise destructed in its use, when it comes in contact with the conductive tab 230a, 230b or similar feature of a connector housing, when inserted and in use. Likewise, the angled lead in 236a, 236b prevents the seal spring 100, or other inserted seal, from being marred, warped, ripped or torn or otherwise destructed in its use.

The conductive tabs 230a, 230b of the conductive outer housing 200 have a conductive coating, the conductive tabs 230a, 230b are therefore able to provide an element or portion of a grounding scheme for a high voltage connector assembly containing the conductive outer housing 200.

Figure 4:
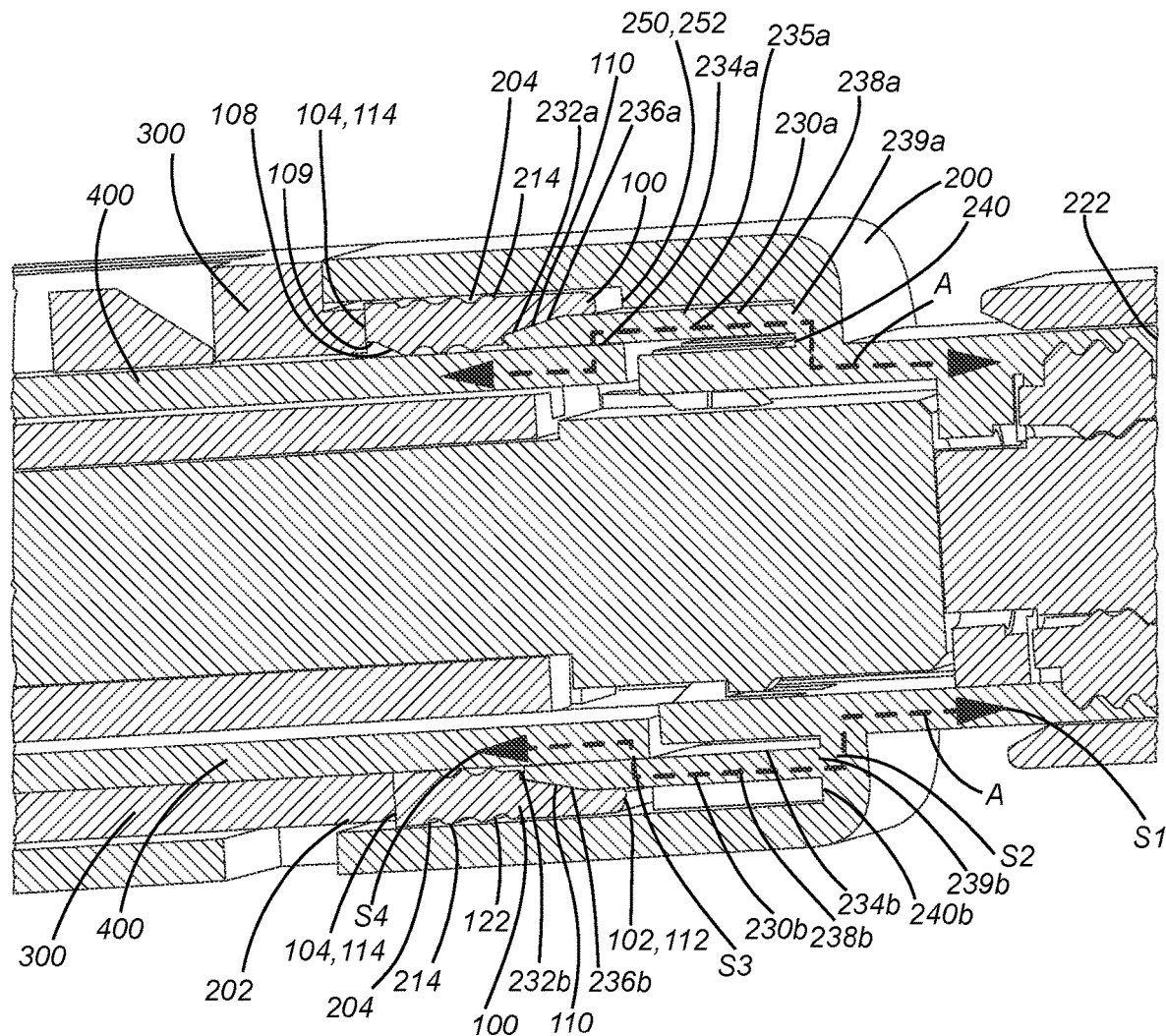
FIG. 4 is a cross section view of the completed connector assembly having the conductive outer housing, the conductive outer housing having the seal spring inserted and residing in the cavity of the conductive outer housing, the second outer housing installed, the conductive third outer housing installed, and shows the EMI path along the high voltage connector assembly.

Here, the conductive coating of the conductive tab 230a, 230b provides for the implementation of a grounding scheme involving the conductive outer housing 200 making conductive contact with an inserted conductive third outer housing 400 (see, FIG. 4). Moreover, this is facilitated by the cantilever beam portion of the conductive tab 230a, 230b making substantial contact with the conductive third outer housing 400. Specifically, the first surface 234a, 234b of each of the conductive tabs 230a, 230b will contact the surface of the conductive third outer housing 400. The seal spring 100 will also provide a compression and spring force against the conductive tab 230a, 230b and press the conductive tab 230a, 230b against the conductive third outer housing 400 when assembled. Thus, a portion of the connector assembly grounding scheme is completed when the conductive coating on the conductive tab 230a, 230b contacts the conductive third outer housing 400.

Illustrated in detail within FIG. 4 is an example of the conductive outer housing 200 being fully assembled in a completed connector assembly, having the seal spring 100, the second outer housing 300, and the conductive third outer housing 400 present. Here, as mentioned, the cantilever beam arm 238a, 238b will slightly flex, the flexing motion being in a direction opposite, or counter to, the direction the conductive tab 230a, 230b makes contact with the inner side wall 109 of the seal spring 100. The direction the conductive tab 230a, 230b flexes is generally inwards, a direction towards the inner cavity 204, inner aperture 108 or opposing one of another conductive tab 230a, 230b (as discussed previously). Thus, as shown in FIG. 4 the first surface 234a, 234b of each of the conductive tabs 230a, 230b will further contact the surface of the conductive third outer housing 400 which has been inserted, is present, and resides within the conductive outer housing 200 in the completed connector assembly. Here, the conductive third outer housing 400 is engaging with the first surface 234a, 234b and presses the conductive tabs 230a, 230b further into the inner side wall 109 of seal spring 100. Thereby, the seal spring 100 compresses which results in the generation of an upward spring force on the conductive tab 230a, 230b, providing more force, additional force, for higher contact pressure of the conductive tabs 230a, 230b against the conductive third outer housing 400 than would be present without the seal spring 100. The higher contact pressure, providing, and resulting in, better electrical conductivity between the conductive tabs 230a, 230b, and the conductive third outer housing 400, when the high voltage connector assembly is in use. Also, this force and subsequent pressure is much more resistant to stress relaxation compared to the use of the conductive tab 230a, 230b, cantilever beam arm 238a, 238b, and housing 200 made from resin alone. Again, the benefit of the seal spring 100 is higher contact pressure between the conductive outer housing 200 and the conductive third outer housing 400. The conductive third outer housing 400 is preferably a plated resin housing, electrically conductive, an element of a grounding scheme within the connector assembly, and one which aids in shielding of the connector assembly. As previously mentioned, the conductive outer housing 200 is also preferably electrically conductive, metallic and comprised of a metal infused resin and also aids in shielding of the connector assembly when in use. The grounding elements in the respective conductive outer housing 200 may also be, for example, plated surfaces, a traditional stamped shield, foil lined surfaces, or other electrically conductive materials utilized within, on, or by the conductive outer housing 200 for grounding purposes. As mentioned, a portion of a grounding scheme for a connector assembly which uses the conductive outer housing 200 can be completed when the conductive tab 230a, 230b makes contact with the conductive third outer housing 400.

Figure 5:
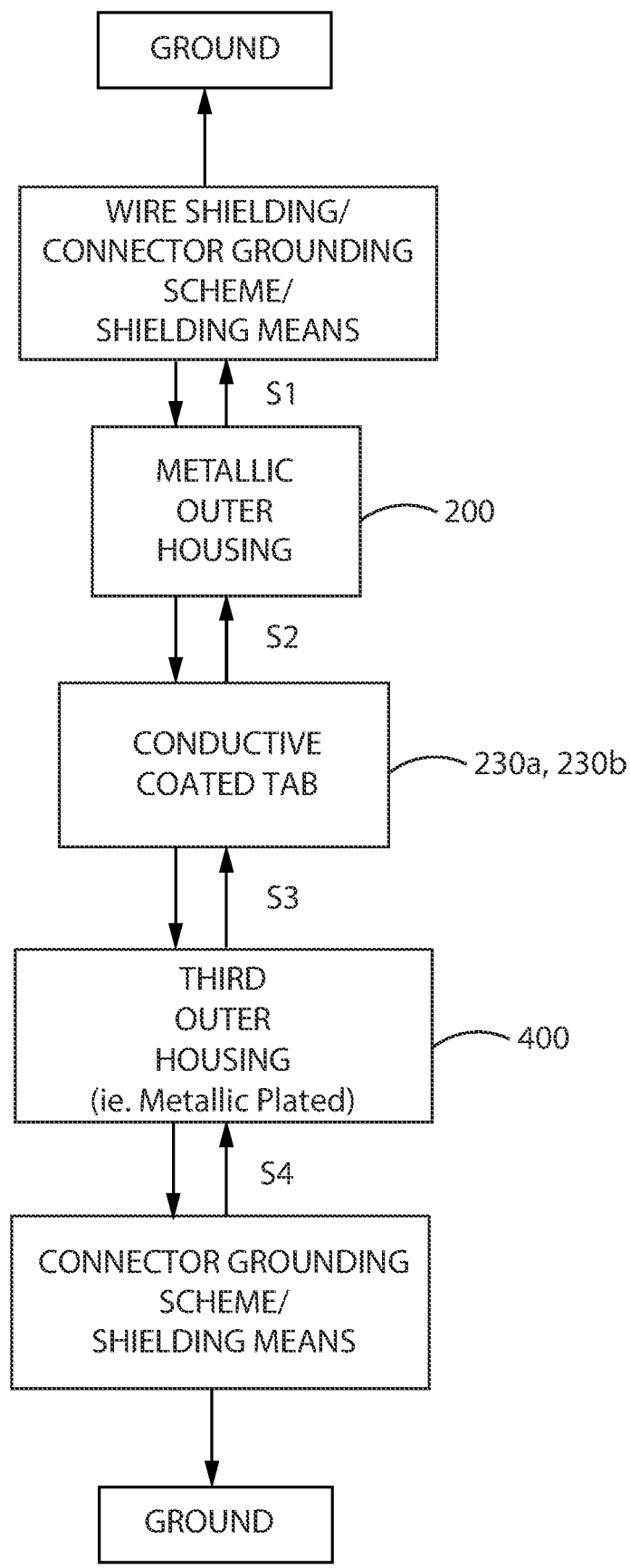
FIG. 5 is a flowchart illustrating the path taken by the EMI along the high voltage connector assembly which employs the conductive outer housing having conductive tabs.

The method for shielding and grounding the connector assembly utilizing the conductive outer housing 200 of this invention, includes the EMI flow path A, shown as a single multiple dashed line in FIG. 5 for illustrative purposes only. The EMI flow path A travels from for example, one of a wire shielding (not shown), a connector grounding scheme (not shown), or a traditional shielding means (not shown, ie. stamped shield) which contacts a surface of the conductive outer housing 200 and against such respective shielding means (not shown) inside or of the conductive outer housing 200, the EMI then traveling and conducting to and through the conductive outer housing 200, through the electrically conductive coated, conductive tab 230a, 230b, then traveling and conducting into the conductive third outer housing 400, and further to a connector grounding scheme (not shown), or traditional shielding means (not shown, ie. stamped shield), and leading to ground. The reverse of this flow path can also be accomplished, vice versa, in the case where an EMI flow path is in the opposite direction, dependent on the location of the ground, grounding device, or grounding element (see, FIG. 5, 6).

FIG. 5 is a flowchart illustrating the path taken by the EMI along the high voltage connector assembly which employs the conductive outer housing 200. As shown in FIG. 5, the EMI, in Step 1 (S1), travels from the for example, one of a wire shielding (not shown), a connector grounding scheme (not shown), or a traditional shielding means (not shown, ie. stamped shield) directly to the conductive outer housing 200. The EMI, in Step 2 (S2), then travels through the conductive outer housing 200 directly to the conductive tab 230a, 230b, contacting the conductive third outer housing 400. In Step 3 (S3), the EMI travels directly from the conductive tab 230a, 230b to the conductive third outer housing 400. After which, in Step 4 (S4), the EMI travels directly to further connector grounding scheme (not shown), or traditional shielding means (not shown, ie. stamped shield), and leading to ground.

As alternatively shown in FIG. 5, the reverse of the aforementioned flow path can also be accomplished, vice versa of the aforementioned, in the case where the EMI flow path is in the opposite direction due to the location of the ground, grounding device, or grounding element. The EMI may pass through and travel directly from a connector grounding scheme (not shown), or a traditional shielding means (not shown, ie. stamped shield) directly to the conductive third outer housing 400 as in Step 4 (S4), to the conductive tab 230a, 230b as in Step 3 (S3), to the conductive outer housing 200 as in Step 2 (S2), to the one of a wire shielding (not shown), a connector grounding scheme (not shown), or a traditional shielding means (not shown, ie. stamped shield) as in Step 1 (S1), and leading to ground.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

I claim:

1. A method for reducing the effect of electromagnetic interference (EMI) to provide EMI protection to a connector assembly having a conductive outer housing, said method comprising the steps of:
   providing said connector assembly with a conductive outer housing;
   providing said conductive outer housing with at least one tab, said at least one tab being contiguous to said conductive outer housing and extending within an inside portion of said conductive outer housing;
   providing said at least one tab with a conductive coating;
   inserting said conductive outer housing into another conductive outer housing, said at least one tab of said conductive outer housing being in contact with said another conductive outer housing;
   conducting said EMI, generated by at least said conductive outer housing, to said at least one tab;
   conducting said EMI from said at least one tab to said another conductive outer housing; and
   thereafter conducting said EMI from said another conductive outer housing to a ground.

2. The method for reducing the effect of electromagnetic interference (EMI) to provide EMI protection to a connector assembly having a conductive outer housing according to claim 1, further comprising a step of providing said conductive outer housing with another tab.

3. The method for reducing the effect of electromagnetic interference (EMI) to provide EMI protection to a connector assembly having a conductive outer housing according to claim 1, further comprising a step of providing said conductive outer housing with another tab; and providing said another tab with a conductive coating.

4. The method for reducing the effect of electromagnetic interference (EMI) to provide EMI protection to a connector assembly having a conductive outer housing according to claim 1, further comprising a step of inserting a seal spring into said conductive outer housing.

5. A method for reducing the effect of electromagnetic interference (EMI) to provide EMI protection to a connector assembly having a conductive outer housing, said method comprising the steps of:
   providing said connector assembly with a conductive outer housing;
   providing said conductive outer housing with at least one tab, said at least one tab being contiguous to said conductive outer housing and extending within said conductive outer housing;
   providing said at least one tab with a conductive coating,
   inserting said conductive outer housing into another conductive outer housing, said at least one tab of said conductive outer housing being in contact with said another conductive outer housing;
   conducting said EMI, generated by at least said another conductive outer housing, to said at least one conductive tab;
   conducting said EMI from said at least one conductive tab to said conductive outer housing, said at least one conductive tab extending within an inside portion of said conductive outer housing; and
   thereafter conducting said EMI from said conductive outer housing to a ground.

6. The method for reducing the effect of electromagnetic interference (EMI) to provide EMI protection to a connector assembly having a conductive outer housing according to claim 5, further comprising a step of providing said conductive outer housing with another tab.

7. The method for reducing the effect of electromagnetic interference (EMI) to provide EMI protection to a connector assembly having a conductive outer housing according to claim 5, further comprising a step of providing said conductive outer housing with another tab; and providing said another tab with a conductive coating.

8. The method for reducing the effect of electromagnetic interference (EMI) to provide EMI protection to a connector assembly having a conductive outer housing according to claim 5, further comprising a step of inserting a seal spring into said conductive outer housing.

\* \* \* \* \*